Jan. 22, 1957

H. VAN BUREN 2,778,112

FOOT MEASURING DEVICE

Filed April 3, 1952

INVENTOR
Harry Van Buren
BY Munn Liddy & Nathanson

ATTORNEYS

United States Patent Office 2,778,112
Patented Jan. 22, 1957

2,778,112

FOOT MEASURING DEVICE

Harry Van Buren, Carlsbad, N. Mex.

Application April 3, 1952, Serial No. 280,227

1 Claim. (Cl. 33—3)

This invention relates to an improvement in measuring devices, and particularly to an indicating device for use in obtaining the proper fit of shoes and similar articles.

It is an object of this invention to provide a simple, light weight, easily portable measuring instrument which can be conveniently carried by sales people and others while engaged in their employment.

Another object of this invention is to devise a convenient means for accurately determining the position of portions of elements inserted into containers or other devices, and for determining the position of portions of the anatomy within protecting devices, for example, in determining the position of the toes of a person within a shoe.

It is a further object of this invention to provide a measuring or indicating device which can be readily adjusted and affixed in any one of numerous positions.

It is still another object of this invention to provide a measuring device which has an indicator movably attached thereto in such a manner as to adapt the device to measuring distances between two points when measurement cannot be made along a straight line.

These and other advantages and objects will become apparent from the following description of the present invention illustrated in the accompanying drawing, in which.

Similar reference characters represent similar parts in the several figures.

Figure 1:
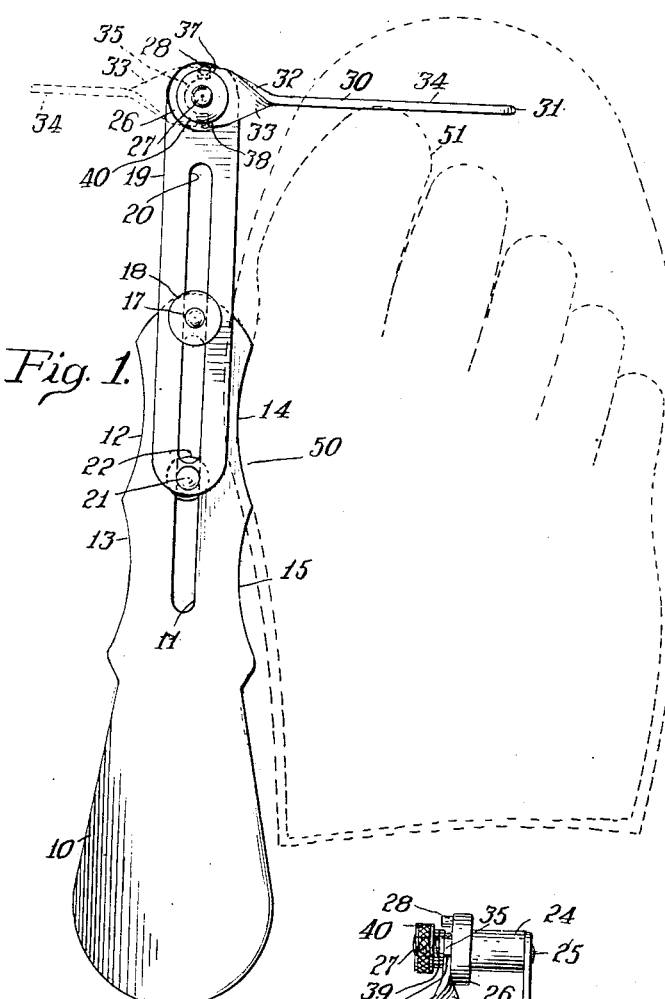
Figure 1 is a plan view of the measuring device showing the manner in which it is employed in determining the position of toes within a shoe or similar article.

There are many occasions when it is necessary or desirable to determine the position of elements within an enclosure when such elements cannot be seen. This is particularly true in shoe stores and stores which sell similar appliances. Many different devices and gadgets have been developed in attempts to overcome the problem involved. Often the devices are very complex in nature and employ two or more relatively movable elements. As commonly experienced, a person buying a shoe places his or her foot on some instrument which serves to indicate the size most nearly suited to the foot in question. When the new shoe is placed on the wearer's foot, however, despite the fact that the foot has been measured by the salesman, there are still uncertainty and distrust in the prospective purchaser's mind. The average purchaser is particularly not sure of the exact location of his toes.

A common sight in a shoe store is that of a purchaser attempting to compress the uppers of his new shoes to determine whether there is adequate room for his toes. In order to make such determination with greater certainty, there were developed X-ray or fluoroscope machines in which a purchaser's feet could be placed while encompassed by the new shoes. By means of the machine the exact location of one's toes could be determined. However, as is well known such machines have been found to be harmful and have been banned by law in most localities.

The convenience of having some sort of device for the purpose has been more keenly felt since the ban of such machines. It will be apparent from the following description that I have devised a measuring instrument which serves to take the place of the X-ray and similar machines.

My device comprises a simple tool which can be combined with a shoe horn and carried in the pocket of salesmen or others. I have provided my tool with indentations which are adapted to be placed against the bunion bone of a foot for example, and a slidable element having an indicating arm pivotally connected thereto. By placing an indentation alongside the bunion bone so that the bone is received therein, swinging the indicator to proper position and clamping the slidable elements in proper position, the tool can be adjusted to indicate the distance between the bunion bone and toes. This can be done while one's foot is outside of a shoe.

After the shoe has been placed on the foot the tool can then be placed in proper position along the bunion bone, which can normally be readily ascertained through the shoe covering, and the indicator will show the exact location of the toes. The tool is adaptable for use with either right or left feet by reason of the fact that the indicator is swivelly connected to the tool proper. Shoe salesmen usually carry a shoe horn or spoon in their pockets and, as will be noted, I have provided a shoe horn on the tool so that the two instruments may be combined in one.

Referring now particularly to the drawings, reference character 10 indicates the shoe horn or main portion of my tool. The shoe horn is provided with a longitudinally extending slot 11 and indentations 12, 13, 14 and 15 formed along the side thereof. At one end of the slot a pin 16 is riveted to the main element. The pin is provided with threads 17 which threadingly engage a knurled nut 18. A sliding member 19, which has a longitudinally extending slot 20, is mounted on one side of the main element 10. At one end member 10 is provided with a pin 21 which is secured thereto as by riveting. Pin 21 extends through slot 11 and is headed as indicated by numeral 22, so as to engage the rear face of main element 10. Pin 16 is received by slot 20 in slidable member 19. Nut 18 has a base 23 which is greater in extent than the lateral dimensions of slot 20 and can be brought to bear on the upper surface of member 19 so as to lock the latter member in slidable position with respect to main member 10.

Slidable member 19 is also provided with a support 24 having a projecting pin 25 riveted to member 19. Support 24 also has a flange 26 and a threaded extension 27. Stop pin 28 is secured to the flange 26 in any convenient manner. The pin is in line with the longitudinal axis of the slots 11 and 20. Support 24 extends laterally of main element 10 and slidable member 19.

Figure 2:
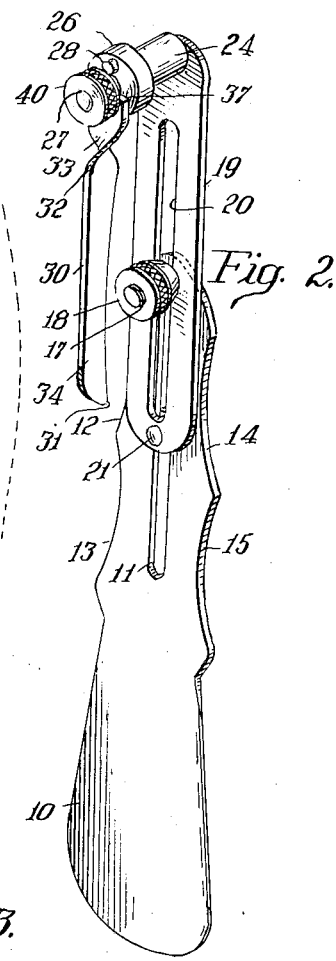
Figure 2 is a perspective elevational view of the device.
Figure 4:
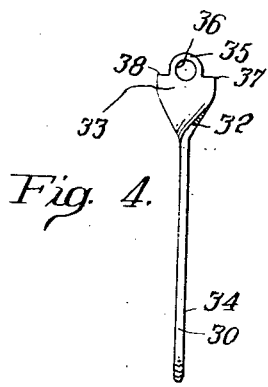
Figure 4 is a plan view showing an element forming a part of my invention.
Figure 3:
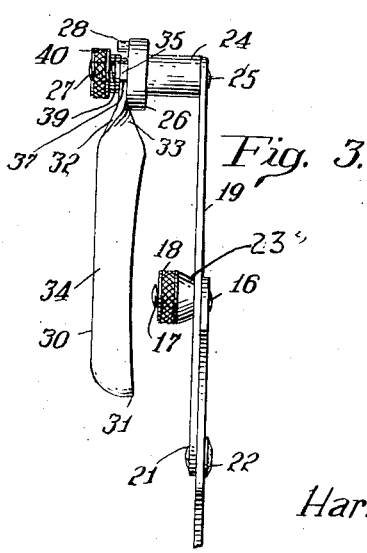
Figure 3 is a partial side elevational view showing the means for interconnecting the elements.

Indicator 30 comprises a flat piece of metal or other suitable material pointed as at 31, and twisted or formed at 32 so as to have a portion 33 extending at right angles to the main blade 34 of the indicator. The portion 33 is formed so as to provide a ring 35 having an opening 36 for receiving pin 27. The portion 33 is also provided with shoulders 37 and 38 and is flattened so as to seat on flange 26. When the indicator is in the position shown in Figures 2 and 3, the shoulders are each 90 degrees away from the stop pin 28.

A friction compression spring 39 abuts against the upper surface portion 33 and against a knurled nut 40. The knurled nut can be adjusted on the threaded extension 27 to obtain the proper friction on the indicator, or to lock the indicator in position. As indicated by the phantom lines in Figure 1, the indicator can be swung to the right or to the left a distance of 90 degrees from the position it assumes when not being used. The main portion 10 is curved so as to provide a shoe horn on the reverse side of the indicator. Thus, the projecting elements, such as 18, 27 and 30, etc., will not come into contact with a person's foot when the device is being used as a shoe horn. The indicator pivots on an axis extending laterally of the pin, whereas member 19 is movable longitudinally thereof.

Figure 1 gives an indication of the manner in which the device can be employed to indicate the position of toes within a shoe. With the foot out of the shoe the device is alined along the side of the foot so that one of the indentations or indicator elements 12—15 receive the bunion joint 50 of the foot. The movable indicator element 30 is then swung in a plane substantially parallel to the plane of the indentations until it extends toward the toes and at right angles to the slots 11 and 20. Next, the sliding element 19 is moved along the main member 10 until the indicator 13 is in alinement with the edge of the toe 51. The sliding element is then locked in position by means of the nut 18. The indicator 34 can also be locked in position by nut 40. When the foot is placed within the shoe the same indentation that was alined with the bunion bone when the tool was set is again alined with said bone. The shoe upper, of course, lies between the indentation and the foot. When such alinement is made the indicator 30 instantly gives the precise location of the edge of the toe 51.

From the above description and the accompanying drawings it is clear that I have devised a tool of great utility to shoe salesmen, as well as others. Furthermore, my tool is of such a nature that it can be conveniently used and easily carried on one's person. Also, by the very nature of its construction, it is simple in operation and may be cheaply manufactured. It should be further noted that my tool or indicator will always serve to give a positive indication as there are no parts which will wear out or require adjustment. The tool will last indefinitely without any maintenance being necessary. It is contemplated that the tool can be made out of any suitable material. Aluminum has been found to be most satisfactory since such material has a pleasing appearance and is light in weight.

While I have shown and described a preferred form of my invention, it will be understood that variations in details of form may be made without departure from the invention as defined in the appended claim.

I claim:

A measuring instrument comprising a base member having a longitudinal slot, an indentation on said member, said indentation lying in a plane parallel to said slot, a second member, a pin mounted in said second member and slidably connected in said slot, a second slot formed in said second mentioned member, a second pin connected to said base member, said second pin extending through said second mentioned slot, means mounted on said second pin for engaging said second member so as to secure said second member in position on said base member, a support connected to said second member and extending laterally thereof, and an indicating element pivotally connected to said support, said indicating element comprising a blade and having a portion extending at right angles to said blade and parallel to said slots, said indicating element being pivotal to a position in which said blade is in alignment with the longitudinal axis of said first mentioned slot and extending laterally of said slot.

References Cited in the file of this patent

UNITED STATES PATENTS

| Number | Name | Date |
|---|---|---|
| 226,429 | Varnum | Apr. 13, 1880 |
| 1,033,301 | Bresnahan | July 23, 1912 |
| 1,297,500 | Scharun | Mar. 18, 1919 |
| 1,529,167 | Clausing | Mar. 10, 1925 |
| 1,850,852 | Scholl | Mar. 22, 1932 |
| 2,148,649 | Scholl | Feb. 28, 1939 |
| 2,527,168 | Wehler | Oct. 24, 1950 |